US008734993B2

(12) United States Patent
Byun

(10) Patent No.: US 8,734,993 B2

(45) Date of Patent: May 27, 2014

(54) ELECTRODE ASSEMBLY AND LITHIUM RECHARGEABLE BATTERY COMPRISING THE SAME

(75) Inventor: Inseop Byun, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 0 days.

(21) Appl. No.: 13/569,949

(22) Filed: Aug. 8, 2012

(65) Prior Publication Data

US 2013/0236790 A1 Sep. 12, 2013

(30) Foreign Application Priority Data

Mar. 12, 2012 (KR) ........................ 10-2012-0025256

(51) Int. Cl.
*H01M 4/13* (2010.01)

(52) U.S. Cl.
USPC ..................... 429/224; 429/231.1; 429/231.2; 429/231.3

(58) Field of Classification Search
USPC ......................... 429/224, 231.1, 231.2, 231.3
See application file for complete search history.

(56) References Cited

U.S. PATENT DOCUMENTS

| | | | | |
|---|---|---|---|---|
| 7,494,746 | B2 * | 2/2009 | Tarnopolsky | 429/332 |
| 2007/0026312 | A1 * | 2/2007 | Imachi et al. | 429/217 |
| 2007/0026315 | A1 * | 2/2007 | Lampe-Onnerud et al. | 429/224 |
| 2011/0177378 | A1 * | 7/2011 | Han et al. | 429/153 |
| 2012/0052379 | A1 * | 3/2012 | Roh et al. | 429/211 |
| 2012/0231325 | A1 * | 9/2012 | Yoon et al. | 429/163 |

FOREIGN PATENT DOCUMENTS

| | | | |
|---|---|---|---|
| KR | 10-2009-0008870 | A | 1/2009 |
| KR | 10-2009-0078128 | A | 7/2009 |
| KR | 10-2009-0120304 | A | 11/2009 |

* cited by examiner

*Primary Examiner* — Milton I Cano
*Assistant Examiner* — Carmen Lyles-Irving
(74) *Attorney, Agent, or Firm* — Knobbe Martens Olson & Bear LLP

(57) ABSTRACT

In one aspect, an electrode assembly comprising a positive electrode, a negative electrode and a separator, wherein the positive electrode further comprises a first positive electrode active material layer, and a second positive electrode active material layer formed on one surface of the first positive electrode active material layer, the first positive electrode active material layer further comprises a first positive electrode active material containing manganese (Mn), and the second positive electrode active material layer further comprises a second positive electrode active material containing cobalt (Co) and a lithium battery comprising the same are provided.

17 Claims, 3 Drawing Sheets

30 42 43 41 80 46 40 16 50 60 17 70 20 10 23 21 22

ELECTRODE ASSEMBLY AND LITHIUM RECHARGEABLE BATTERY COMPRISING THE SAME

CROSS-REFERENCE TO RELATED APPLICATIONS

This application claims the benefit of Korean Patent Application No. 10-2012-0025256, filed on Mar. 12, 2012, in the Korean Intellectual Property Office, the disclosure of which is incorporated herein in its entirety by reference.

BACKGROUND

1. Field

One or more embodiments relate to an electrode assembly and a lithium rechargeable battery comprising the same.

2. Description of the Related Technology

Lithium rechargeable batteries include an electrode assembly that includes a positive electrode, a negative electrode and a separator, as well as an electrolyte and a case for accommodating the electrode assembly and the electrolyte.

The positive electrode is formed by coating a positive electrode active material on a positive electrode current collector. Examples of the positive electrode active material may include lithium cobalt oxide, lithium manganese oxide and lithium nickel oxide. Specifically, a lithium manganese oxide (LMO)-based active material is widely used in view of its cost effectiveness. However, the manganese (Mn) contained in the positive electrode active material may be eluted during charging/discharging of battery, resulting in a gradual reduction in the battery's capacity with repeated charging/discharging cycles. Also, the battery capacity may be rapidly reduced when the battery is stored at high temperature for an extended period.

To overcome this problem, a type of conventional rechargeable battery has been manufactured using a mixture of other positive electrode active materials with varying composition ratios. However, this mixtures of other positive electrode active materials is more expensive than the lithium manganese oxide (LMO)-based active material. Thus, as the composition ratio increases, the battery performance may become better. However, increasing the composition ratio may adversely affect the cost.

SUMMARY

Some embodiments provide an electrode assembly, which solve the problem of increased cost from using a mixture of different positive electrode active materials, specifically using a mixture of different positive electrode active materials capable of creating a synergetic effect of suppressing elution of manganese (Mn) at high temperature at low cost, as well as provide a lithium rechargeable battery comprising the electrode assembly. Some embodiments provide an electrode assembly which employs a positive electrode plate including a first positive electrode active material layer containing manganese (Mn) and a second positive electrode active material layer containing cobalt (Co) to suppress manganese (Mn) from being eluted/precipitated from the positive electrode plate at high temperatures, thereby demonstrating excellent recovery capacity and recovery capacity during an extended storage period at high temperature while capable of being manufactured at low cost, and a lithium rechargeable battery comprising the electrode assembly.

Some embodiments provide an electrode assembly comprising a positive electrode, a negative electrode and a separator, wherein the positive electrode further comprises a first positive electrode active material layer, and a second positive electrode active material layer formed on one surface of the first positive electrode active material layer, wherein the first positive electrode active material layer comprises a first positive electrode active material containing manganese (Mn), and further wherein the second positive electrode active material layer comprises a second positive electrode active material containing cobalt (Co).

In certain embodiments the first positive electrode active material may comprise a lithium manganese oxide (LMO)-based active material.

In certain embodiments the first positive electrode active material layer may be formed by coating the first positive electrode active material with an amount of about 85 wt % to about 95 wt % based on a total weight of a positive electrode active material.

In certain embodiments the second positive electrode active material may be a lithium nickel cobalt manganese (NCM)-based active material or a lithium cobalt oxide (LCO) active material.

In certain embodiments the NCM-based active material may be contained in an amount of about 6 wt % to about 50 wt % based on a total weight of the positive electrode active material.

In certain embodiments the LCO-based positive electrode active material may be contained in an amount of about 3 wt % to about 50 wt % based on a total weight of the positive electrode active material.

In certain embodiments the second positive electrode active material layer may be formed by the process of coating the second positive electrode active material in an amount of about 5 wt % to about 15 wt % based on a total weight of the positive electrode active material.

In certain embodiments each of the first positive electrode active material layer and the second positive electrode active material layer may comprise a binder, wherein the binder contained in the first positive electrode active material layer and the binder contained in the second positive electrode active material layer are different materials.

In certain embodiments each of the first positive electrode active material layer and the second positive electrode active material layer may further comprise a binder, wherein the binder contained in the first positive electrode active material layer and the binder contained in the second positive electrode active material layer are the same material.

In certain embodiments the first positive electrode active material layer may have a spinel structure or an olivine structure.

In certain embodiments, there is provided a rechargeable battery comprising the electrode assembly, and further comprising an electrolyte.

In certain embodiments the electrolyte may include a tris (trimethylsilyl)phosphite as an additive.

In certain embodiments there is provided a rechargeable battery comprising a positive electrode, a negative electrode, a separator disposed between the positive electrode and the negative electrode, and an electrolyte, wherein the positive electrode comprises a first positive electrode active material layer and a second positive electrode active material layer formed on one surface of the first positive electrode active material layer, the first positive electrode active material layer further comprises a first positive electrode active material containing manganese (Mn), and the second positive electrode active material layer further comprises a second positive electrode active material containing cobalt (Co).

In certain embodiments there is provided a method of manufacturing an electrode assembly comprising a positive electrode, a negative electrode and a separator, wherein the positive electrode is formed by a method comprising forming a first positive electrode material layer by coating a first positive electrode active material on a positive electrode current collector, further comprising forming a second positive electrode material layer by coating a second positive electrode active material on one surface of the first positive electrode active material layer, and rolling the second positive electrode active material layer, wherein the first positive electrode active material contains manganese (Mn) and the second positive electrode active material contains cobalt (Co).

In certain embodiments the first positive electrode active material may be a lithium manganese oxide (LMO)-based active material.

In certain embodiments the second positive electrode active material may be a lithium nickel cobalt manganese (NCM)-based active material or a lithium cobalt oxide (LCO) active material.

In certain embodiments the NCM-based active material may be contained in an amount of about 6 wt % to about 50 wt % based on a total weight of the positive electrode active material.

In certain embodiments the LCO-based positive electrode active material may be contained in an amount of about 3 wt % to about 50 wt % based on a total weight of the positive electrode active material.

In certain embodiments the coating and the rolling may be alternately repeated.

As described above, in certain embodiments the present-described electrode minimizes contact areas between negative ions in the electrolyte and particles of the first positive electrode active material by forming cobalt-containing (Co) second positive electrode active material layer on the first manganese-containing positive electrode active material layer. Such a configuration reduces an amount of cobalt-containing positive electrode active material lended in the positive electrode active material layer, thereby suppressing elution of Mn at low cost.

In addition, certain embodiments provide a rechargeable battery that suppresses Mn from being eluted from the positive electrode active material layer, particularly at high temperature, thereby providing excellent recovery capacity and recovery capacity of battery at high temperature.

Additional embodiments and their advantages are set forth in part in the description which follows and may be learned by practice of the invention.

BRIEF DESCRIPTION OF THE DRAWINGS

The aspects, features and advantages of the present embodiments will be more apparent from the following detailed description in conjunction with the accompanying drawings, in which.

DETAILED DESCRIPTION

Figure 1:
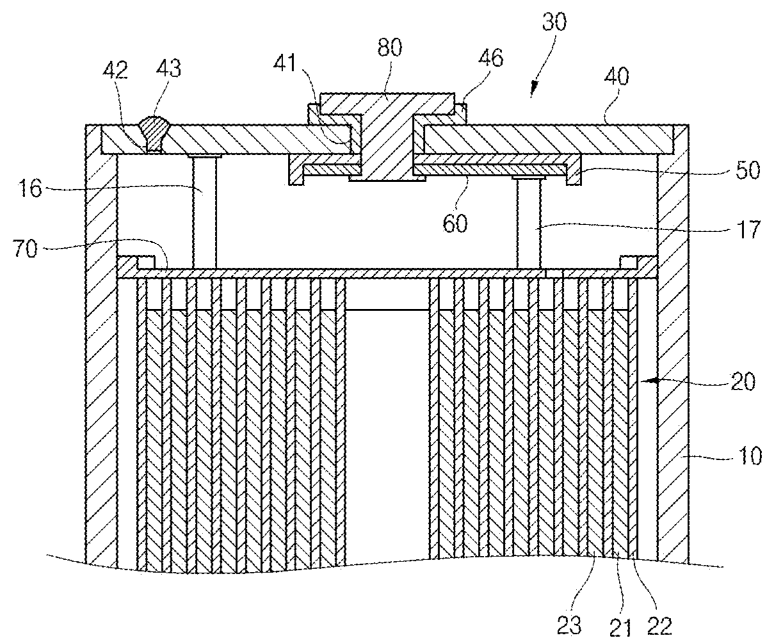
FIG. 1 is a partially sectional view of a prismatic lithium rechargeable battery according to an embodiment.

Hereinafter, an electrode assembly according to an embodiment and a rechargeable battery comprising the same will now be described in detail with reference to exemplary embodiments thereof.

The electrode assembly of the present embodiments comprises a positive electrode, a negative electrode and a separator, further wherein the positive electrode comprises a first positive electrode active material layer, and a second positive electrode active material layer formed on one surface of the first positive electrode active material layer, the first positive electrode active material layer further comprises a first positive electrode active material containing manganese (Mn), and the second positive electrode active material layer further comprises a second positive electrode active material containing cobalt (Co).

In certain embodiments, the electrode assembly is formed by a method comprising stacking a positive electrode plate, a negative electrode plate and a separator and rolling the stacked structure. In certain embodiments, the method comprises forming the positive electrode plate by coating a first positive electrode active material on a positive electrode current collector and coating a second positive electrode active material on the first positive electrode active material layer to form a positive electrode and connecting a positive electrode tab thereto, and the negative electrode plate is formed by coating a negative electrode active material on a negative electrode current collector and connecting a negative electrode tab thereto, and the separator is disposed between the positive electrode plate and the negative electrode plate.

In certain embodiments, an LMO-based active material useful to a lithium ion rechargeable battery may be used as the first positive electrode active material. For example, typical examples of the positive electrode active material layer may include lithium compounds represented by formulas (1) to (4):

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yM'_zA_4 \quad (4)$$

wherein $0.9 \le x \le 1.1$, $0 \le y \le 0.5$, $0 \le z \le 0.5$, M and M' are the same or different, and each of M and M' is selected from the group consisting of Mg, Al, Co, K, Na, Ca, Si, Ti, Sn, V, Ge, Ga, B (boron), As, Zr, Mn, Cr, Fe, Sr, V and rare-earth elements, A is selected from the group consisting of O (oxygen), F (fluorine), S (sulfur) and P (phosphorus), and X is selected from the group consisting of F, S and P.

In certain embodiments, the second positive electrode active material layer comprises a second positive electrode active material containing Co, preferably a lithium nickel cobalt manganese (NCM)-based active material or a lithium cobalt oxide (LCO) active material, and most preferably an NCM-based active material.

In certain embodiments general NCM-based positive electrode active materials useful in lithium ion rechargeable battery may be used as the first positive electrode active material. For example, in certain embodiments the positive electrode active material layer may comprise lithium composite metal oxide represented by $Li[Ni_xCo_{1-x-y}Mn_y]O_2$ (Here, $0<x<0.5$ and $0<y<0.5$.), but not limited thereto.

In certain embodiments, a general LCO-based positive electrode active material useful in a lithium ion rechargeable battery may be used as the LCO-based active material. For example, in certain embodiments, the LCO-based positive electrode active material may include $LiCoO_2$ or $LiNi_{1-x-y}CoM_yO_2$ ($0 \leq x \leq 1$, $0 \leq y \leq 1$, $0 \leq x+y \leq 1$, and M is a metal such as Al, Sr, Mg or La.), but not limited thereto.

In certain embodiments the second positive electrode active material may be coated in an amount of from about 3 wt % to about 50 wt %, preferably from about 6 wt % to about 50 wt % of NCM-based active material or from about 3 wt % to about 50 wt % of LCO-based active material, based on a total weight of the positive electrode active material including both the first positive electrode active material and the second positive electrode active material. If the second positive electrode active material is used in an amount less than about 3 wt %, a double-layered structure effect cannot be achieved. On the other hand, if the second positive electrode active material is used in an amount greater than about 50 wt %, a conspicuous cost saving effect may not be demonstrated, compared to the overall obtainable effect.

In certain embodiments, the positive electrode may comprise the first positive electrode active material layer coated in an amount from about 85 wt % to about 95 wt % and the second positive electrode active material layer coated in an amount from about 5 wt % to about 15 wt % based on a total weight of the positive electrode active material. Therefore, elution of Mn contained in the first positive electrode active material layer due to charging/discharging is suppressed by minimizing contact areas between negative ions in the electrolyte and particles of the first positive electrode active material by coating the second positive electrode active material layer. Since the overall thickness of the positive electrode is limited by the battery manufacturing process, a thickness of the first positive electrode active material layer is relative to a thickness of the second positive electrode active material layer. Therefore, if the thickness of the second positive electrode active material layer is too small, a portion of the first positive electrode active material layer may come into direct contact with the separator including the electrolyte, disabling the minimization of Mn elution. If the thickness of the second positive electrode active material layer is excessively large, a large amount of expensive cobalt, will typically be used, increasing the manufacturing cost.

In certain embodiments, the positive electrode is manufactured by a method comprising forming a first positive electrode active material layer which comprises coating a first positive electrode active material slurry, which in turn may be prepared by mixing a first positive electrode active material and a binder and optionally a conductive agent in a solvent, on a positive electrode current collector, and further comprising coating a second positive electrode active material slurry, which in turn may be prepared by mixing a second positive electrode active material and a binder and optionally a conductive agent in a solvent, on the first positive electrode active material layer.

In certain embodiments, aluminum or an aluminum alloy may be used as the positive electrode current collector. In certain embodiments, the positive electrode current collector may be formed in a foil or mesh shape.

In certain embodiments, the binder serves to allow particles of the positive electrode active material to bind to each other or allow the positive electrode active material to bind to a current collector. Examples of the binder includes, but is not limited to, polyvinylalcohol, carboxymethylcellulose, hydroxypropylcellulose, diacetylcellulose, polyvinylchloride, carboxylated polyvinylchloride, polyvinylfluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

In certain embodiments, the binders added to the first and second positive electrode active materials may be the same with or different from each other. Preferably, different types of binders are used, which is because the binders are cross-linked to further increase a binding force between layers.

The conductive agent is used to impart conductivity to an electrode. Any electrically conductive material may be used as a conductive agent unless it causes any chemical change, and examples thereof may include natural graphite, artificial graphite, carbon black, acetylene black, ketjen black, carbon fiber, a metal powder or a metal fiber including copper, nickel, aluminum, silver, and so on, a polyphenylene derivative, or combinations thereof.

In certain embodiments, the first positive electrode active material layer may comprise a compound having a spinel or olivine structure. For example, the first positive electrode active material layer may include a compound having a spinel structure of $LiMn_2O_2$ or an olivine structure of $LiMnPO_4$.

In certain embodiments the positive electrode may be manufactured by a method comprising coating the second positive electrode active material on the first positive electrode active material layer and rolling the coated second positive electrode active material layer. For example, the second positive electrode active material may be coated on the LMO-based first positive electrode active material layer and then rolled. Alternatively, the second positive electrode active material may be repeatedly coated on the first positive electrode active material layer by primarily and secondarily coating and may then finally be rolled.

In certain embodiments, the coating and the rolling may be alternately repeated.

In certain embodiments the negative electrode is formed by a method comprising coating a negative electrode active material on a negative electrode current collector. Copper or a copper alloy may be used as the negative electrode current collector. In certain embodiments the negative electrode current collector may be formed in a foil or mesh shape.

In certain embodiments, the negative electrode active material may be formed in a slurry phase prepared by dispersing a binder and a conductive agent, and if necessary, a thickener, in a solvent to then be coated on the negative electrode current collector.

In certain embodiments, the negative electrode active material may be a material capable of intercalating and deintercalating lithium ions. The negative electrode active material may comprise crystalline or amorphous carbon, carbonaceous negative electrode active material (pyrolyzed carbon, coke, or graphite) of carbon complex, combusted organic polymer compounds, carbon fiber, tin oxide compounds, lithium metal or alloys of lithium and other elements. Examples of the amorphous carbon may include hard carbon, cokes, mesocarbon microbead (MCMB) sintered at 1500° C. or less, mesophase pitch-based carbon fiber (MPCF), and so on. Examples of the crystalline carbon may include graphite based materials, and specific examples thereof may include natural graphite, graphitized cokes, graphitized MCMB, graphitized MPCF and so on.

Non-limiting examples of suitable separator materials include polyethylene, polypropylene, polyvinylidene fluoride, and multi-layers thereof such as a polyethylene/polypropylene double-layered separator, a polyethylene/polypropylene/polyethylene three-layered separator, and a polypropylene/polyethylene/polypropylene three-layered separator.

In addition, the method of forming the positive electrode by preparing the positive electrode active material slurry and coating the same, the method of forming the negative electrode by preparing the negative electrode active material slurry and coating the same, and the method of forming the electrode assembly by sequentially stacking the positive electrode, the separator, the negative electrode and the separator, are widely known in the art, and detailed descriptions thereof will be omitted.

Some embodiments, provide a rechargeable battery comprising an electrode assembly according to the present embodiments and an electrolyte.

In certain embodiments the electrolyte may include a lithium salt and a nonaqueous organic solvent.

The lithium salt may function as a lithium ion supply source in a battery and enable a basic operation of a lithium battery. Examples of the lithium salt that may be used includes any one salt selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (Here, x and y are natural numbers of 1 to 20, respectively), LiCl and LiI, or a mixture containing two or more of them.

Examples of the nonaqueous organic solvent may include carbonate, ester, ether, ketone, and so on. Examples of the carbonate may include dimethylcarbonate (DMC), diethyl carbonate (DEC), dipropyl carbonate (DPC), methylpropyl carbonate (MPC), ethylpropyl carbonate (EPC), methylethyl carbonate (MEC) ethylene carbonate (EC), propylene carbonate (PC), butylene carbonate (BC), and so on. Examples of the ester may include n-methyl acetate, n-ethyl acetate, n-propyl acetate, and so on. Among the nonaqueous organic solvents, the carbonate solvent may include a mixed solvent of a cyclic carbonate with a linear carbonate.

In certain embodiments, various types of additives may be added unless the advantages and effects of the present invention are impaired.

In certain embodiments, a well known additive may be arbitrarily used as the additive and one additive or two or more additives may be used in combination with an arbitrary composition ratio.

Examples of the additive may include an over-charge preventing agent, or supplemental agents for improving high-temperature recovery capacity or cycling characteristics.

According to one embodiment, the first positive electrode active material layer may further comprise a phosphite compound represented by Formula 1:

Formula 1

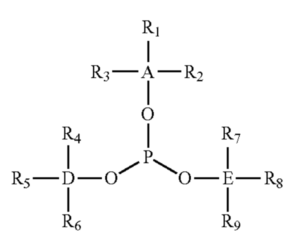

wherein A, D and E are the same or different and are each independently Si, C, Ge or Sn, $R_1$ to $R_9$ are the same or different and are each independently hydrogen or a substituted or unsubstituted alkyl group. The alkyl may be a C1 to C10 alkyl. The substituted alkyl may be an alkyl in which at least one hydrogen is substituted with halogen or an alkyl in which at least one hydrogen is substituted with fluorine. As described above, the compound represented by Formula 1 is added to the electrolyte to then be used for a lithium rechargeable battery. During an initial stage of charging and discharging (i.e., a formation process), the compound represented by Formula 1 is decomposed to form a protection layer on a positive electrode while not remaining in the electrolyte. The thickness of the protection layer is not an important factor in demonstrating the advantages and effects of the present embodiments. The protection layer may be formed to an appropriate thickness according to charging and discharging conditions, which can be easily understood by those in the related art.

Here, in certain embodiments, the compound represented by Formula 1 may be added to the electrolyte in an amount of from about 0.1 to about 10 wt % based on the total weight of the electrolyte including a lithium salt and a nonaqueous solvent. If the compound represented by Formula 1 is utilized in the range stated above, a coating for suppressing the elution of Mn from the positive electrode active material may be formed on the positive electrode active material layer. After the initial stage of charging and discharging, the coating may exist on the positive electrode active material layer without remaining in the electrolyte. In certain embodiments, the phosphite-based compound represented by Formula 1 may further comprise tris(trimethylsilyl)phosphite [P—(O—Si$(CH_3)_3)_3$].

Examples of the over-charge preventing agent may include a partially hydrogenated body of biphenyl, alkylbiphenyl, terphenyl or terphenyl, an aromatic compound such as cyclohexylbenzene, t-butylbenzene, t-amylbenzene, diphenylether or dibenzofuran, a partial fluoride of the aromatic compound such as 2-fluorobiphenyl, o-cyclohexylfluorobenzene or p-cyclohexylfluorobenzene, a fluorine-containing anisole compound such as 2,4-difluoroanisole, 2,5-difluoroanisole or 2,6-difluoroanisole, and so on.

In addition, a single material or two or more materials combined in an arbitrary combination at an arbitrary combination ratio may be used as the over-charge preventing agent.

In certain embodiments, when the nonaqueous electrolyte includes the over-charge preventing agent, the over-charge preventing agent may be included in an arbitrary concentration unless the advantages and effects of the present invention are noticeably impaired, generally in an amount ranging from about 0.1 wt % to about 5 wt % based on the total weight of the nonaqueous electrolyte.

The over-charge preventing agent included in the nonaqueous electrolyte may suppress rupture or fire of a nonaqueous electrolyte rechargeable battery due to an over-charge while improving the safety of the nonaqueous electrolyte rechargeable battery, both of which are desirable characteristics.

Meanwhile, examples of the additive for improving capacity sustaining characteristics after being stored at high temperature and cycle characteristics may include carbonate compounds such as vinylenecarbonate, vinylethylenecarbonate, fluoroethylenecarbonate, 4-(trifluoromethyl)-ethylenecarbonate, phenylethylene carbonate, erythritancarbonate, or spiro-bis-dimethylenecarbonate, carboxylic anhydrides such as succinic anhydride, glutaric anhydride, maleic anhydride, citraconic anhydride, glutaconic anhydride, itaconic anhydride, diglycolic anhydride, cyclohexane carboxylic anhydride, cyclopentanetetracarboxylic dianhydride, phenylsuccinic anhydride, sulfur-containing compounds such as ethylenesulfite, 1,4-propanesultone, 1,4-butanesultone, methane sulfonic methyl, busulfan, sulfolane, sulfolene, dimethylsulfone, diphenylsulfone, methylphenylsulfone, dibutyldisulfide, dicyclohexyldisulfide, tetramethylthirammonosulfide, N,N-dimethylmethanesulfoneamide, or N,N- diethylmethanesulfoneamide, nitrogen-containing compounds such as 1-methyl-2-pyrrolidinone, 1-methyl-2-piperidone, 4-methyl-2-oxazolidinone, 1,4-dimethyl-2-imidazolidinone, or N-methylsuccinimide, hydrocarbon compounds such as heptane, octane, or cycloheptane, fluorine-containing aromatic compounds such as fluorobenzene, difluorobenzene, or zotrifluoride.

In addition, a single material or two or more materials combined in an arbitrary combination at an arbitrary combination ratio may be used as the additive.

In certain embodiments, when the nonaqueous electrolyte further comprises the additive, the additive may be included in an arbitrary concentration unless the advantages and effects of the present invention are noticeably impaired, generally in an amount ranging from about 0.1 wt % to about 5 wt % based on the total weight of the nonaqueous electrolyte.

Hereinafter, a rechargeable battery including the electrode assembly according to one embodiment will be described in detail.

FIG. 1 is a partially sectional view of a prismatic lithium rechargeable battery according to an embodiment. The method for manufacturing the rechargeable battery to be described below is provided for a better understanding of the present embodiments, and technical contents known in the related art may be appropriately modified and used.

Referring to FIG. 1, the lithium rechargeable battery according to an embodiment comprises a can 10, an electrode assembly 20, a cap assembly 30 and an electrolyte. In one embodiment the lithium rechargeable battery is manufactured by a method comprising placing the electrode assembly 20 and the electrolyte within the can 10 and sealing a top end of the can 10 by the cap assembly 30.

The electrode assembly 20 comprises a positive electrode plate 21, a negative electrode plate 23 and a separator 22. In one embodiment the electrode assembly 20 may be formed by the method comprising sequentially stacking the positive electrode plate 21, the separator 22, the negative electrode plate 23 and the separator 22 and winding the resultant stacked structure.

The separator 22 is disposed between the positive electrode plate 21 and the negative electrode plate 23 to prevent an electrical short circuit between the positive electrode plate 21 and the negative electrode plate 23.

In one embodiment the cap assembly 30 may be comprised of a cap plate 40, an insulation plate 50, a terminal plate 60 and an electrode terminal 80. The cap assembly 30 is coupled to the insulation case 70 to seal the can 10.

The electrode terminal 80 is inserted into a terminal throughhole 41 formed at the center of the cap plate 40. When the electrode terminal 80 is inserted into the terminal throughhole 41, a tube-type gasket 46 is coupled to an outer surface of the electrode terminal 80 and inserted together. Therefore, the electrode terminal 80 is electrically insulated from the cap plate 40.

The electrolyte is injected into the can 10 through an electrolyte injection hole 42 after the cap assembly 30 is assembled with the top end of the can 10. The electrolyte injection hole 42 is sealed by a separate plug 43. The electrode terminal 80 is connected to a negative electrode tab 17 of the negative electrode plate 23 or a positive electrode tab 16 of the positive electrode plate 21, functioning as a negative electrode terminal or a positive electrode terminal.

In some embodiments, the lithium rechargeable battery may be formed as a unit battery having a positive electrode plate/separator/negative electrode plate structure, a bi-cell having a positive electrode plate/separator/negative electrode plate/separator/positive electrode plate structure, or a stacked battery structure in which unit batteries are repeatedly stacked.

In addition, in some embodiments the lithium rechargeable battery may be manufactured in a prismatic shape, a cylindrical shape or a pouch type shape.

Figure 2:
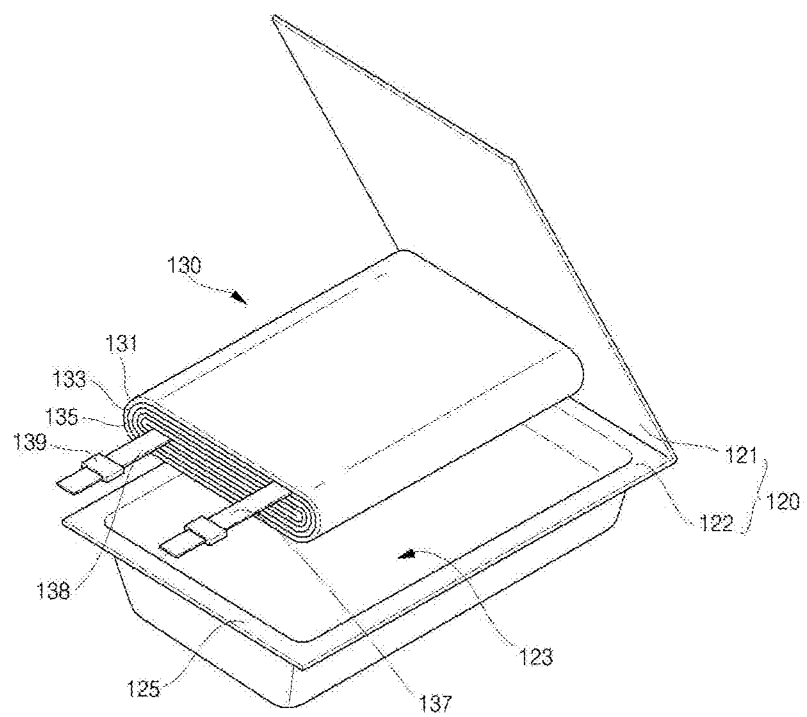
FIG. 2 is a perspective view of a pouch-type lithium rechargeable battery according to an embodiment.

Referring to FIG. 2, a pouch-type lithium rechargeable battery according to an embodiment comprises an electrode assembly 130 and a pouch sheath 120 accommodating the electrode assembly 130.

Since the electrode assembly 130 is manufactured in the same manner as the aforementioned method for manufacturing the electrode assembly, a detailed description thereof will be omitted. In one embodiment a positive electrode tab 137 protruding a predetermined length from a positive electrode plate 131 is adhered to the positive electrode plate 131, and a negative electrode tab 138 protruding a predetermined length from a negative electrode plate 135 is adhered to the negative electrode plate 135, but not limited thereto. In addition, an insulation tape 139 may further be provided to prevent an electrical short circuit between each of the positive electrode tab 137 and the negative electrode tab 138 and the pouch sheath 120.

The positive electrode tab 137 and the negative electrode tab 138 are drawn to the outside of the pouch sheath 120 through either surface of the pouch sheath 120. The positive electrode tab 137 and the negative electrode tab 138 are electrically connected to a protection circuit module (not shown). In addition, upper and lower insulation plates (not shown) may further be attached to top and bottom portions of the electrode assembly 130 to prevent the electrode assembly 131 from contacting the pouch sheath 120.

The pouch sheath 120 has a front surface 121 and a rear surface 122 coupled to the front surface 121, which are formed by folding the center of its pouch film. A groove 123 may be formed by pressing to accommodate the electrode assembly 130.

A general process of forming a pouch bare cell will be briefly described. First, the electrode assembly 130 is formed by winding a multi-layered stack having a positive electrode plate 131, a separator 133, and a negative electrode plate 135 sequentially stacked in a jelly roll configuration. In order to prevent a short circuit between the positive electrode plate 131 and the negative electrode plate 135 when winding the jelly roll, a separator is adhered to an electrode surface exposed to the outside or an internal electrode. The formed jelly roll is placed in the groove 123 formed in the rear surface 122 of the pouch sheath 120, and a peripheral part 125 of the pouch sheath 120 is adhered by applying heat and pressure to seal the front and rear surfaces 121 and 122 of the pouch sheath 120, thereby forming a pouch type bare cell battery.

Next, the electrode assembly and the rechargeable battery according to the present invention will be described in more detail with respect to Examples and Comparative Examples. The following examples illustrate the present invention in more detail. These examples, however, should not in any sense be interpreted as limiting the scope of the present embodiments.

Example 1

Multi-Layered Positive Electrode Active Material: LMO (94 wt %) and NCM (6 wt %)

A positive electrode active material of $LiMn_2O_4$, a binder of polyvinylidene fluoride (PVDF) (Solef6020 manufactured by Solvay Bruxelles), and a conductive agent of acetylene black (Super P manufactured by MMM) were mixed at a weight ratio of 90:5:5, then were dispersed in a solvent of N-methyl-2-pyrrolidone to provide a positive electrode active material slurry. The provided first positive electrode active material slurry was coated on an aluminum foil at a thickness of 15 μm, dried, and compressed to provide a first positive electrode active material layer. In order to form a second positive electrode active material layer, a second positive electrode active material of NCM ($LiNi_{0.5}Co_{0.2}Mn_{0.3}O_2$, manufactured by L&F Material Co., Ltd, Waegwan-Eup, South Korea), a binder of Solef21216 (PVdF+HFP in a mixing ratio of 88:12, manufactured by Solvay Bruxelles) and a conductive agent of acetylene black (Super P manufactured by 3M, Minneapolis, Minn.) were mixed at a weight ratio of 90:5:5, then were dispersed in a solvent of acetone to provide a second positive electrode active material slurry.

The provided second positive electrode active material slurry was coated on the first positive electrode active material layer at a loading rate of 6 wt % based on a total weight of the positive electrode active material, dried, and compressed to form the second positive electrode active material layer, thereby forming a positive electrode plate.

Accordingly, in order to form the positive electrode plate, the first positive electrode active material layer and the second positive electrode active material layer were formed, including 94 wt % of a first positive electrode active material (LMO) and 6 wt % of a second positive electrode active material (NCM).

A negative electrode active material of graphite, a binder of styrene-butadiene rubber (SBR) and a thickener of carboxymethyl cellulose (CMC) were mixed in a weight ratio of 96:2:2 and then dispersed in water to provide a negative electrode active material slurry. The resultant slurry was coated on a copper foil having a thickness of 10 μm, dried and then compressed to form a negative electrode plate.

A 25 μm thick separator made of PE+PP (manufactured by Tonen) is inserted between the formed electrode plates and wound to form the electrode assembly, and the electrolyte was injected into a 123 μm thick pouch having a 2 mm section to manufacture a pull pouch cell of a 20 mm×30 mm single plate.

The electrolyte was prepared by mixing 0.5M $LiPF_6$ in a mixed solvent of ethylene carbonate (EC)/ethylmethyl carbonate (EMC)/dimethylcarbonate (DMC) (30:55:15 by volume %) and adding additives of 0.4% $LiBF_4$, 5% fluoroethylenecarbonate (FEC), 1% vinylcarbonate (VC) and 1.5% tris(trimethylsilyl)phosphite [P—(O—$Si(CH_3)_3)_3$].

Examples 2-12

A lithium rechargeable battery was prepared in accordance with the same procedure as in Example 1, except that the respective components shown in Table 1 were used, and $LiCoO_2$ (KD20) was used as a lithium cobalt oxide (LCO) active material.

Comparative Examples 1-8

A lithium rechargeable battery was prepared in accordance with the same procedure as in Example 1, except that the respective components shown in Table 1 were used, and a first active material and a second active material, which are not in a multi-layered structure, unlike in the above-mentioned examples.

TABLE 1

| | First positive electrode active material (wt %) LMO | Second positive electrode active material (wt %) NCM | LCO $LiCoO_2$(LCO, KD20) | tris(trimethylsilyl) phosphite added to electrolyte |
|---|---|---|---|---|
| Example 1 | 94 | 6 | | ○ |
| Example 2 | 90 | 10 | | ○ |
| Example 3 | 85 | 15 | | ○ |
| Example 4 | 97 | | 3 | ○ |
| Example 5 | 90 | | 10 | ○ |
| Example 6 | 85 | | 15 | ○ |
| Example 7 | 94 | 6 | | x |
| Example 8 | 90 | 10 | | x |
| Example 9 | 85 | 15 | | x |
| Example 10 | 97 | | 3 | x |
| Example 11 | 90 | | 10 | x |
| Example 12 | 85 | | 15 | x |
| Comparative Example 1 | 100 | | | ○ |
| Comparative Example 2 | 90 | 10 | | ○ |
| Comparative Example 3 | 85 | 15 | | ○ |
| Comparative Example 4 | 97 | | 3 | ○ |
| Comparative Example 5 | 90 | | 10 | ○ |
| Comparative Example 6 | 85 | | 15 | ○ |
| Comparative Example 7 | 80 | 20 | | ○ |
| Comparative Example 8 | 70 | 30 | | ○ |

Comparative Example 9

A was prepared in accordance with the same procedure as in Example 1, except that 10% HFP based gel (Solef11010, Solvay, Brussels, Belgium) was used as a second positive electrode active material.

The rechargeable lithium batteries prepared in Examples and Comparative Examples were tested and evaluated as follows.

Experimental Example 1

High-Temperature Recovery Capacity

The respective rechargeable batteries of Examples and Comparative Examples were charged at 0.1 C rate under constant current and constant voltage (CC-CV) of 0.5 C/4.2V for 2 hours, placed for aging at 60° C. for 20 days, and then discharged at 0.1 C (1.1 mA) to a cut-off voltage of 2.75 V under constant current (CC) for standard charge-discharge. Thereafter, the batteries were charged at 4.4 C to a cut-off voltage of 2.7 V under constant current and constant voltage (CC-CV) for 3 hours and then discharged at 1 C (740 mA)/3.1 V under constant current (CC). Then, the final discharge capacity of each of the rechargeable batteries was measured. The recovery capacity was measured using the following equation:

Recovery capacity=Final discharge capacity/Final charge capacity×100

Experimental Example 2

High-Temperature Retention Capacity

The battery capacities each were measured immediately after charging batteries and discharging at a discharge rate of 0.2 C with a discharge terminal voltage of 2.7 V after being storing at 20 C for 4 weeks.

Retention capacity=Final discharge capacity/Initial discharge capacity×100.

The results are shown in the following Table 2.

TABLE 2

| | High temperature recovery capacity (%) | High temperature recovery capacity (%) |
|---|---|---|
| Example 1 | 86.4 | 82.8 |
| Example 2 | 92.1 | 87.7 |
| Example 3 | 94.6 | 92.3 |
| Example 4 | 88.5 | 84.0 |
| Example 5 | 90.4 | 86.7 |
| Example 6 | 96.3 | 88.2 |
| Example 7 | 82.5 | 79.8 |
| Example 8 | 89.2 | 85.2 |
| Example 9 | 92.3 | 89.1 |
| Example 10 | 85.2 | 80.4 |
| Example 11 | 88.2 | 82.3 |
| Example 12 | 92.5 | 85.6 |
| Comparative Example 1 | 70.3 | 66.1 |
| Comparative Example 2 | 75.4 | 73.4 |
| Comparative Example 3 | 80.2 | 78.3 |
| Comparative Example 4 | 83.4 | 80.2 |
| Comparative Example 5 | 78.2 | 75.3 |
| Comparative Example 6 | 80.2 | 77.6 |
| Comparative Example 7 | 82.6 | 79.1 |
| Comparative Example 8 | 83.3 | 80.4 |

As shown in Table 2, the rechargeable batteries according to the present embodiments demonstrated excellent high-temperature retention capacity and recovery capacity, compared to the rechargeable batteries including a single active material having a single layered structure (Comparative Example 1) and different active materials having a single layered structure (Comparative Examples 2 to 8). In particular, the high-temperature retention capacity and recovery capacity of the rechargeable battery according to Comparative Example 8 in which LCO was added in an amount of 30 wt % were lower than those of the rechargeable batteries according to Examples 1, 4 and 10 in which double-layered structure using a small amount of NCM or LCO. Therefore, since an expensive positive electrode active material containing cobalt (Co) is used in a small amount, the positive electrode according to the present invention can reduced the manufacturing cost while improving the capacity of the rechargeable battery.

In addition, when tris(trimethylsilyl)phosphite as an additive was added to the electrolyte (Example 1 to 6), the effect of the rechargeable battery was better than when tris(trimethylsilyl)phosphite as an additive was not added to the electrolyte (Examples 7 to 12), suggesting that addition of tris(trimethylsilyl)phosphite suppressed Mn elution.

Experimental Example 3

Discharge Capacity

The batteries of Comparative Examples 1 and 9 were charged at 0.5 C/4.2V under constant current and constant voltage (CC-CV) for 3 hours, aged at 20° C. for 4 weeks and then discharged at 1 C (740 mA)/3.1V under constant current (CC) to measure low-temperature discharge capacity of each battery. Microscopic view of the positive electrode plates of Comparative Examples 1 and 9 are shown in FIGS. 3 and 4, and comparison results of discharge capacities of the batteries are shown in FIG. 5.

Figure 3:
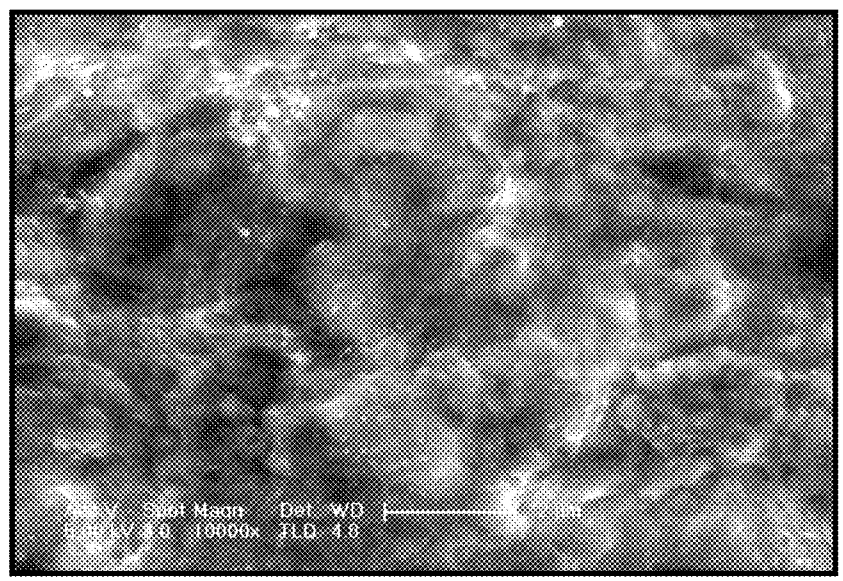
FIG. 3 is a microscopic view of a positive electrode plate prepared in Comparative Example 9.
Figure 4:
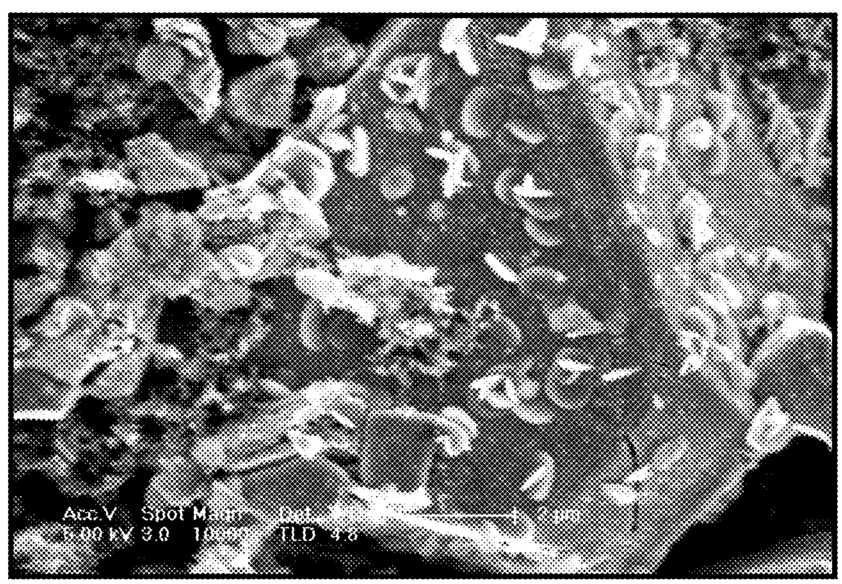
FIG. 4 is a microscopic view of a positive electrode plate prepared in Comparative Example 1.
Figure 5:
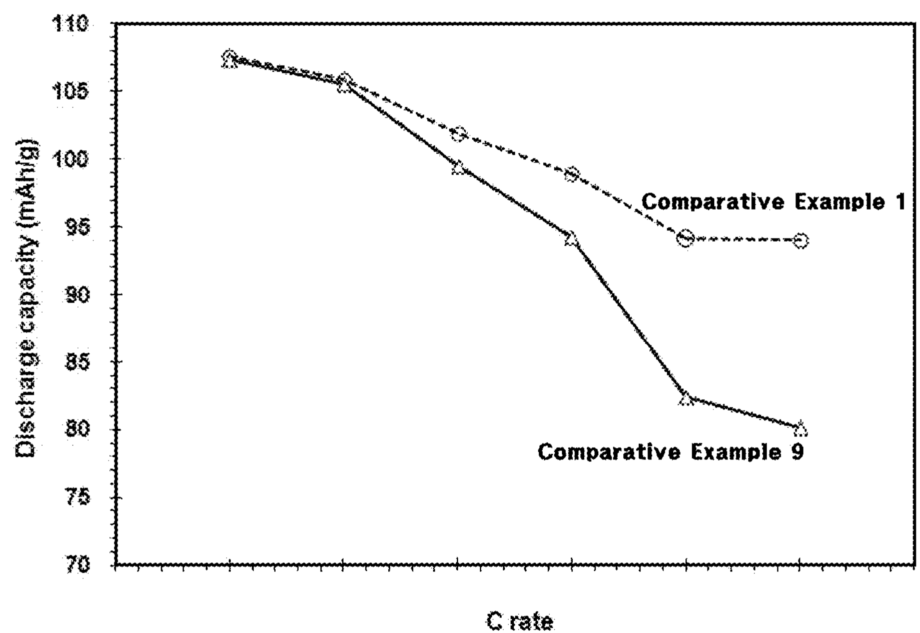
FIG. 5 is a graph illustrating C-rate dependent discharge capacities of the depending on the lithium rechargeable batteries prepared in Comparative Examples 1 and 9.

As shown in FIGS. 3 and 4, manganese (Mn) was not precipitated even by a gel coating. In this case, however, as shown in FIG. 5, battery capacities were considerably reduced, resulting in a considerable reduction in battery performance, which is much lower than that of the battery including a single active material having a single-layered structure.

Therefore, according to the present embodiments, the lithium rechargeable battery having excellent performance can be provided even by using a small amount of a mixture of containing different types of active materials.

Although the present embodiments have been described with reference to certain exemplary embodiments thereof, it will be understood by those skilled in the art that a variety of modifications and variations may be made to the present embodiments without departing from the spirit or scope of the present embodiments defined in the appended claims, and their equivalents.

What is claimed is:

1. An electrode assembly comprising a positive electrode, a negative electrode and a separator, wherein the positive electrode further comprises a first positive electrode active material layer, and a second positive electrode active material layer formed on one surface of the first positive electrode active material layer, the first positive electrode active material layer further comprises a first positive electrode active material containing manganese (Mn), and the second positive electrode active material layer further comprises a second positive electrode active material containing cobalt (Co), wherein the first positive electrode active material layer is formed by coating the first positive electrode active material in an amount of from about 85 wt % to about 95 wt % based on a total weight of positive electrode active material and the second positive electrode active material layer is formed by coating the second positive electrode active material in an amount of from about 5 wt % to about 15 wt % based on the total weight of positive electrode active material.

2. The electrode assembly of claim 1, wherein the first positive electrode active material is a lithium manganese oxide (LMO)-based active material.

3. The electrode assembly of claim 1, wherein the second positive electrode active material comprises a lithium nickel cobalt manganese (NCM)-based active material or a lithium cobalt oxide (LCO) active material.

4. The electrode assembly of claim 3, wherein the second positive electrode active material is NCM-based active material.

5. The electrode assembly of claim 3, wherein the second positive electrode active material is LCO active material.

6. The electrode assembly of claim 1, wherein each of the first positive electrode active material layer and the second positive electrode active material layer further comprises a binder, and the binder contained in the first positive electrode active material layer and the binder contained in the second positive electrode active material layer are different materials.

7. The electrode assembly of claim 1, wherein each of the first positive electrode active material layer and the second positive electrode active material layer comprises a binder, and the binder contained in the first positive electrode active material layer and the binder contained in the second positive electrode active material layer are the same material.

8. The electrode assembly of claim 1, wherein the first positive electrode active material layer has a spinel structure or an olivine structure.

9. A rechargeable battery comprising:
the electrode assembly of claim 1, and
an electrolyte.

10. The rechargeable battery of claim 9, wherein the electrolyte comprises a tris(trimethylsilyl)phosphite as an additive.

11. A rechargeable battery comprising:
a positive electrode,
a negative electrode,
a separator disposed between the positive electrode and the negative electrode, and
an electrolyte,
wherein the positive electrode includes a first positive electrode active material layer and a second positive electrode active material layer formed on one surface of the first positive electrode active material layer, the first positive electrode active material layer further comprises a first positive electrode active material containing manganese (Mn), and the second positive electrode active material layer further comprises a second positive electrode active material containing cobalt (Co), wherein the first positive electrode active material layer is formed by coating the first positive electrode active material in an amount of from about 85 wt % to about 95 wt % based on a total weight of positive electrode active material and the second positive electrode active material layer is formed by coating the second positive electrode active material in an amount of from about 5 wt % to about 15 wt % based on the total weight of positive electrode active material, and wherein the electrolyte comprises tris(trimethylsilyl)phosphite as an additive.

12. A method of manufacturing an electrode assembly comprising a positive electrode, a negative electrode and a separator,
wherein the positive electrode is formed by a method comprising:
forming a first positive electrode material layer by coating a first positive electrode active material on a positive electrode current collector,
forming a second positive electrode material layer by coating a second positive electrode active material on one surface of the first positive electrode active material layer, and
pressure rolling the second positive electrode active material layer,
wherein the first positive electrode active material further comprises manganese (Mn) and the second positive electrode active material further comprises cobalt (Co), and wherein the first positive electrode active material layer is formed by coating the first positive electrode active material in an amount of from about 85 wt % to about 95 wt % based on a total weight of positive electrode active material and the second positive electrode active material layer is formed by coating the second positive electrode active material in an amount of from about 5 wt % to about 15 wt % based on the total weight of positive electrode active material.

13. The method of claim 12, wherein the first positive electrode active material is a lithium manganese oxide (LMO)-based active material.

14. The method of claim 12, wherein the second positive electrode active material is a lithium nickel cobalt manganese (NCM)-based active material or a lithium cobalt oxide (LCO) active material.

15. The method of claim 14, wherein the second positive electrode active material is NCM-based active material.

16. The method of claim 14, wherein the second positive electrode active material is LCO based positive electrode active material.

17. The method of claim 14, wherein the coating and the pressure rolling are alternately repeated.

* * * * *

UNITED STATES PATENT AND TRADEMARK OFFICE

CERTIFICATE OF CORRECTION

PATENT NO. : 8,734,993 B2
APPLICATION NO. : 13/569949
DATED : May 27, 2014
INVENTOR(S) : Inseop Byun It is certified that error appears in the above-identified patent and that said Letters Patent is hereby corrected as shown below:

In the Specification,

In column 8 at lines 66-67, please delete "tetramethylthirammonosulfide," and insert therefore, --tetramethylthiurammonosulfide,--.

In the Claims,

In column 16 at line 40 (approx.), In Claim 17, please delete "claim 14," and insert therefore, --claim 12,--.

Signed and Sealed this
Ninth Day of December, 2014

Michelle K. Lee
*Deputy Director of the United States Patent and Trademark Office*